United States Patent
Shearman (10) Patent No.: US 7,042,716 B2
(45) Date of Patent: May 9, 2006

(54) ERGONOMIC PULL-OUT COMPUTER HOUSING

(76) Inventor: Simon John Edward Shearman, PO Box 1134, Almonte, Ontario (CA) K0A 1A0

( * ) Notice: Subject to any disclaimer, the term of this patent is extended or adjusted under 35 U.S.C. 154(b) by 30 days.

(21) Appl. No.: 10/780,319

(22) Filed: Feb. 18, 2004

(65) Prior Publication Data

US 2005/0047074 A1 Mar. 3, 2005

Related U.S. Application Data

(60) Provisional application No. 60/502,763, filed on Aug. 25, 2003.

(51) Int. Cl.
*G06F 1/16* (2006.01)

(52) U.S. Cl. ............. 361/684; 361/683; 361/724; 312/223.2

(58) Field of Classification Search .............. None
See application file for complete search history.

(56) References Cited

U.S. PATENT DOCUMENTS

| | | | | |
|---|---|---|---|---|
| 4,931,978 A | * | 6/1990 | Drake et al. ............ | 361/680 |
| 5,213,401 A | * | 5/1993 | Hatcher ............... | 312/208.1 |
| 5,611,608 A | * | 3/1997 | Clausen ............... | 312/223.3 |
| 6,099,094 A | | 8/2000 | Lior | |
| 6,169,655 B1 | * | 1/2001 | Helot ................. | 361/686 |
| 6,626,686 B1 | * | 9/2003 | D'Souza et al. ........ | 439/131 |
| 2002/0048151 A1 | * | 4/2002 | Usui et al. ........... | 361/686 |

* cited by examiner

*Primary Examiner*—Lynn Feild
*Assistant Examiner*—Anthony Q. Edwards (57) ABSTRACT

A hinged computer case that can be mounted to the underside of a desk surface directly in front of and hidden from its user and accommodates the ergonomic requirements of the user is described. All peripheral devices meant for user access are located in a flat drive bay, which also forms an adjustable keyboard tray, while the non-access devices are located in a CPU enclosure. In the stow-away position, the computer case hangs from a pair of guide rails with the cable connectors facing up, for easy installation. In the operational position, the computer case pivots 90° and slides on the guide rails. The flat drive bay that supports the keyboard tray s pivotally attached to the CPU enclosure by means of a cable hinge assembly. The hinge assembly enables positioning of the keyboard at a suitable angle for a respective user, and also accommodates the cables between the two enclosures. Media drives needed for upgrades can be added to the sides of the flat drive bay, and they may be used to provide a mouse pad, or/and additional work-space.

19 Claims, 8 Drawing Sheets

ERGONOMIC PULL-OUT COMPUTER HOUSING

This application claims the benifit of Provisional application Ser. No. 60/502,763, filed Aug. 25, 2003.

FIELD OF INVENTION

This invention is directed to a personal computer case, particularly to an Ergonomic Pull-out Computer Housing.

BACKGROUND OF THE INVENTION

Personal computer cases are generally found in two locations; either on the floor, where they can be knocked or bumped by the user's feet, or on the desktop, where they occupy valuable work surface. Although hardware manufacturers are gradually shrinking computer cases to address work space constraints, a smaller case size often means a limited number of components and a corresponding decrease in computer function. Laptop computers are an example of component reduction through advances in engineering and manufacturing, and this type of computer has limited performance due to inadequate cooling capability and space constraints. The laptop computer also, by definition, does not allow for correct ergonomic positioning. There is a need for an ergonomic pull-out computer case that addresses space constraints by utilizing the under-the-desk space in a typical work station, while still providing an expandable case using standard components.

Personal computer towers are often difficult to set up and they have the additional problem of inadequate cable management. With a traditional tower case, the user must climb under the desk in order to install the cables, and access to the tower is awkward. Computer towers are often located under the desk, where the user's feet should be. There is a need for an ergonomic pull-out computer case that addresses the need for easier set-up and more efficient attachment and organization of cables.

If a computer user is sitting in an ergonomically correct position, it is obvious that the space under and behind the keyboard tray is free to use. Since users are different heights and sizes, the keyboard should be adjustable in order to create an ergonomic workstation. The user should have easy access to computer controls and devices without any awkward reaching or stretching. There is a need for an ergonomic pull-out computer that allows the user to adjust his position and still have access to computer controls and devices.

Ergonomics is the improvement of human performance through careful design of the work environment. Working at the computer in an awkward or unnatural position can result in repetitive strain injuries, costing employers, insurers and workers millions of dollars in lost productivity and rehabilitation every year. The generally-accepted ergonomic position for computer use is with the user sitting squarely at the desk, with legs bent at 90°, arms, bent at 90°, the keyboard slightly below elbow height and the wrists level. Most computer workstations require the addition of ergonomic equipment such as adjustable keyboard trays and mouse trays, however the ergonomic pull-out computer of the invention addresses the need for an individual workstation without expensive add-ons.

Computer cases should be manufactured of metal to prevent electromagnetic energy from entering or exiting the case. Electromagnetic energy can cause static inference with other electronic devices around it. An electromagnetic seal is created by ensuring that all sides of the enclosure firmly contact one other so that a ground current can flow between them and block electromagnetic waves. The smaller the gaps between contact points of enclosure walls or cut-outs, the less chance there is of electro-magnetic energy escaping. Therefore a computer housing must be designed with a view to minimizing electromagnetic energy leakage.

U.S. Pat. No. 6,099,094 (Lior) describes a mounting arrangement for computers. One of the problems with Lior's solution is the position of the keyboard with respect to the access devices. Since keyboard tray is located below the access devices, the keyboard is too low for ergonomic positioning unless the desktop is considerably higher than average. If the keyboard tray is drawn up in front of the access devices, CDs or floppy disks cannot be inserted or removed. Another problem with Lior's arrangement is that the computer is fixed to the desk, making cable installation difficult. Even though the guide rails may allow the user to pull out the case far enough to install cables, it would require very long and bulky guides to support such cantilevered weight.

SUMMARY OF THE INVENTION

An object of the invention is to provide an ergonomic pull-out computer that alleviates totally or in part the drawbacks of the prior art mounting arrangements for computers.

Accordingly, the invention provides a pull-out computer housing for enabling easy installation and ergonomic positioning of a computer system units and controls, comprising: a central processing unit (CPU) enclosure for housing all standard units of the computer system; a flat drive bay with a flat top for housing all accessible units of the computer system and for supporting a computer keyboard; and a hinge assembly provided between the CPU enclosure and the flat drive bay for enabling adjustment of the flat top to a preferred angle and a preferred elevation.

The invention is also directed to a kit for facilitating easy installation and ergonomic positioning of a computer system on a desk, while enabling space saving and alternative uses of a computer desk, comprising: a guide rail system for mounting on the back of the desk top; a pull-out computer housing where conventional computer components are repartitioned into standard devices mounted in a CPU enclosure and user-accessible devices mounted in a flat drive bay; and a hinge assembly provided between the CPU enclosure and the flat drive bay for enabling adjustment of the flat drive bay to a preferred angle and a preferred elevation.

Advantageously, the mounting arrangement provided by the present invention results in simplification and consolidation of many aspects of a computer workstation environment. The computer housing is attached to the underside of a desk using a rail system so that the user can slide the computer under the desktop like a drawer when it is not in use. This enables alternative uses of the desk.

Another advantage of the invention is that it utilizes standard PC components, while repartitioning the conventional personal computer components into access and non-access devices. All peripheral devices meant for user access are located in a flat drive bay, which also forms an adjustable keyboard tray, while the standard (non-access) devices are located in a central processing unit (CPU) enclosure. This arrangement enables easy addition of drivers to the sides of the flat drive bay. The additional drivers may be needed for upgrades, and they may be used to provide a mouse pad, or/and additional work-space.

Another advantage of the invention is that the CPU enclosure and the flat drive bay (the keyboard tray) are connected by a hinge assembly that enables positioning of the keyboard at a suitable angle for a respective user, and also accommodates the cables between the two enclosures. The flat drive bay's angle can be fixed by tightening a screw mechanism on an adjustable strut. The CPU enclosure's pivoting hangers allow the user to hang the computer from its guide rails, with the rear cable ports facing up, for easy installation.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where:

FIG. 8b is a detail view of FIG. 8a.

DETAILED DESCRIPTION OF THE INVENTION

In the following, the terms rear, left, right and front are terms used with reference to the computer housing when mounted under a desk as shown in the drawings; these terms are not intended to limit the invention to embodiments of the computer housing mounted under a desk. It is also to be noted that not all elements of an assembly appear on a single view, cross-reference to the appropriate Figures is made throughout the text.

Figure 1:
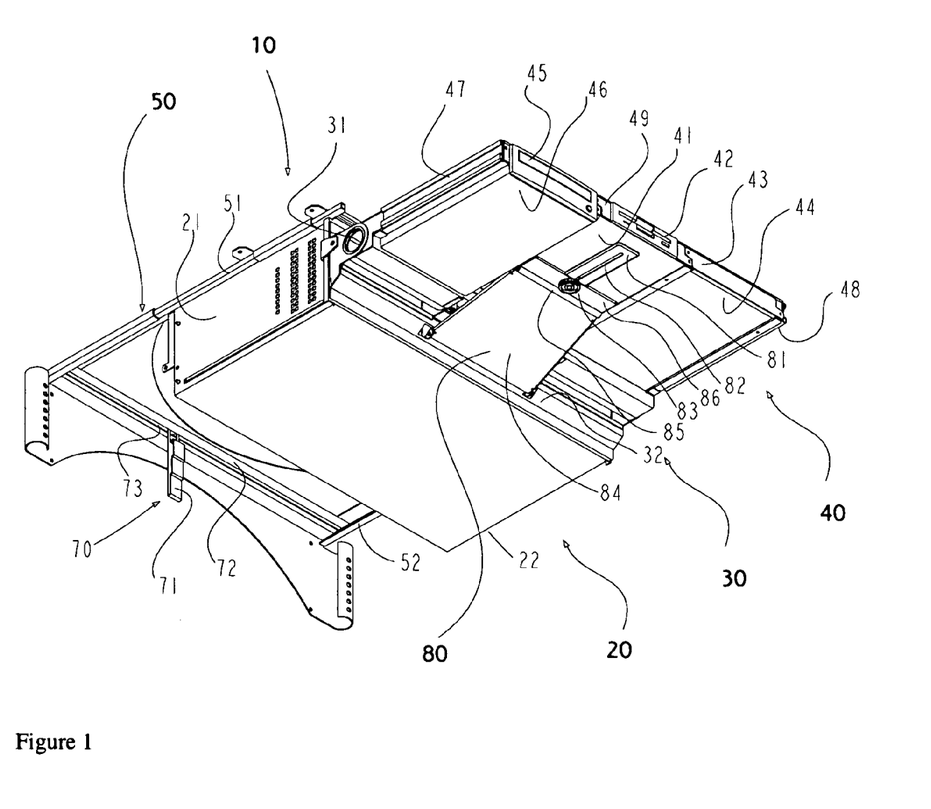
FIG. 1 is an isometric view of the underside of the ergonomic pull-out computer housing attached to the guide rail system with the desk hidden.

FIG. 1 is a perspective view of a preferred embodiment of the present invention, which represents an ergonomic, pull-out computer housing, denoted generally with reference numeral 10.

As indicated above, the computer housing 10 uses standard PC components, while repartitioning the conventional personal computer components into user-accessible devices (i.e. devices meant for frequent user access) and standard devices. All electronic/electrical parts that are not normally accessed by the user are located in a CPU enclosure 20, and all media drives meant for user access are located in a flat drive bay 40, which also forms an adjustable keyboard tray. In the following, the term "standard units" refers to the electronic/electric units of the computer that are not normally accessed by the user. For example motherboard 11, hard drives 12, power supply 13 (see FIG. 2), etc are referred to as standard units of the computer system 10. These units are kept together in CPU enclosure 20, which is at the rear of the system, since day-to-day access to these components is not required.

Regularly accessed components such as CDROM drives, floppy drives, Zip drives, controls and user interface ports are kept together in the flat drive bay assembly 40. These units are referred to in the following as "accessible units".

Figure 6A:
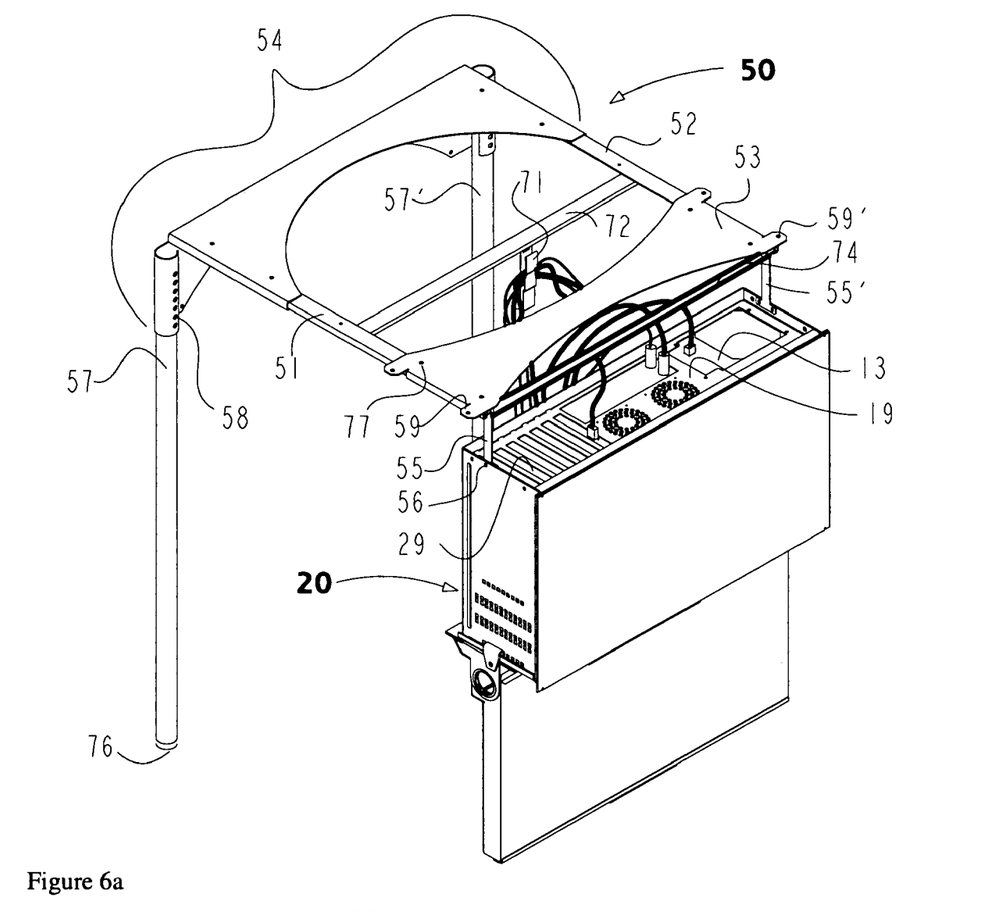
FIG. 6a shows the ergonomic pull-out computer housing in a hanging condition, computer setup position.

The ergonomic pull-out computer housing 10 is attached to the underside of a desk which has been removed for clarity in FIG. 1, but can be seen better in FIG. 7, which will be described later. Housing 10 may be displaced along a guide rail system 50, using two integrated pivoting hangers provided on the rear bottom of the CPU enclosure, as seen in FIG. 6a and described in detail in the accompanying text. In this hanging state, the housing can be displaced between a stow-away position at the back of the desk, and a computer setup position, where the back of the CPU enclosure 20 is accessible for cable insertion/pull-out and dressing as seen in FIG. 6a. During this displacement, the flat bay drive 40 may hang freely from the CPU enclosure 20. When housing 10 is in the stow-away position, the desk may be used for other purposes.

Once the installer has attached the necessary power, network, monitor and optional cables to the rear of the case, with the housing 10 in the computer setup position, the housing can swing up 90° using a pivot assembly 80, described in connection with FIG. 6. Then, the CPU enclosure 20 is slid back and away from the user using the guide rail system 50 and the housing is placed in an operative state.

Figure 2:
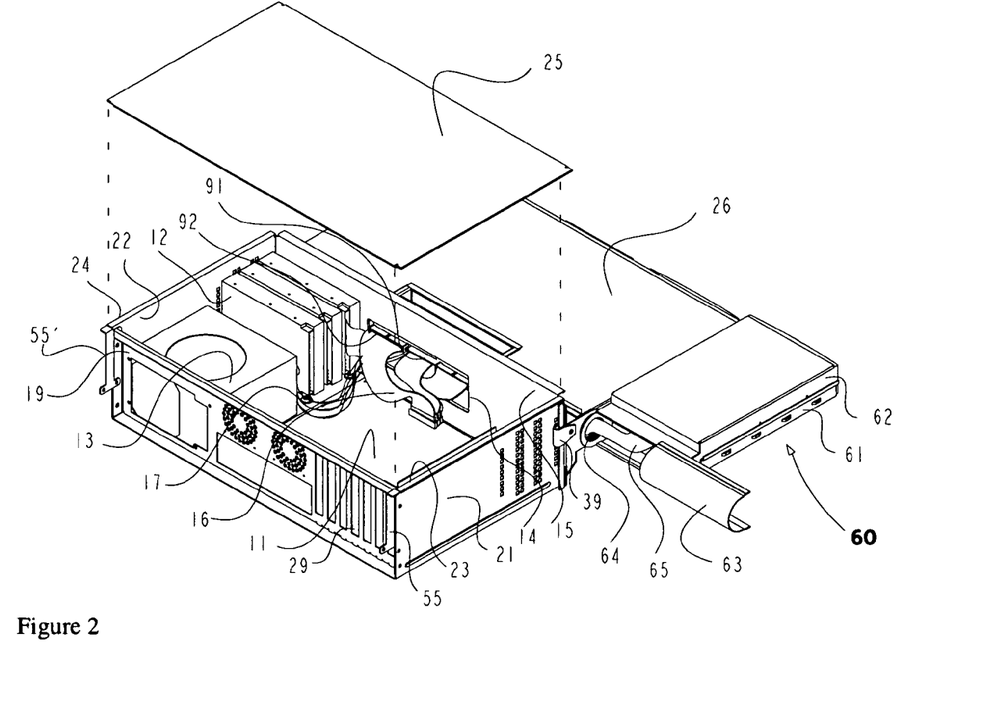
FIG. 2 is a rear isometric view of the ergonomic pull-out computer housing showing the CPU enclosure cover, the flat drive bay cover, and the interconnect access cover in an exploded state.
Figure 3A:
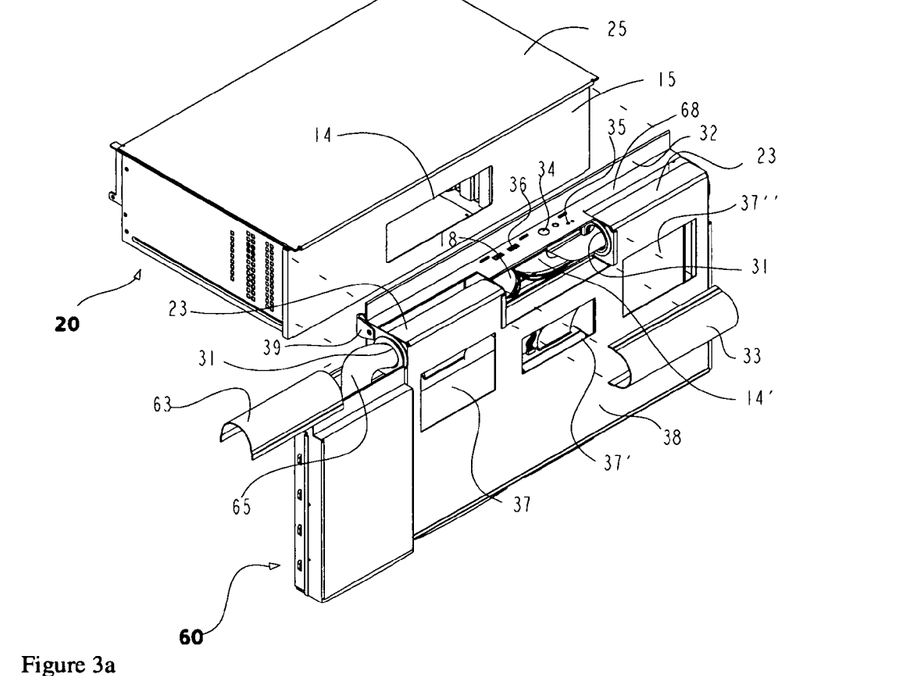
FIG. 3a is a front isometric view of the pull-out computer housing showing the housing in a maintenance position with the flat drive bay rotated down, and the interconnect access covers exploded for cable installation and connection.

A unique hollow cable hinge assembly allows the flat drive bay 40 to elevate and rotate with respect to the CPU enclosure, to place the housing from the hanging state into the operative state. The angular position of the flat drive bay may now be adjusted between a pull-down (or maintenance) position, where it makes a 90° degree angle with the CPU enclosure as seen in FIG. 3a, and a pull-up (or working) position as seen in FIGS. 2 and 7. The height of the flat drive bay 40 can be arranged using the elevation mechanism 28, 39 as seen in more detail on FIG. 4.

In the maintenance position, since the flat drive bay is pulled-down, the operator has access to the cable connectors, indicators and controls, allowing cable installation, switching the computer on/off, and monitoring the operation of the computer. In the pull-up position, the top of the flat drive bay is used to hold a standard keyboard 2 (see FIG. 7). Both the angle of the flat drive bay 40 (also called "the preferred angle") and the elevation (also referred to as "preferred elevation") may be adjusted, to achieve an ergonomically positioned keyboard and mouse for the respective computer user/operator.

The cable hinge assembly 30 has a large hollow hinge 31 that extends preferably along the entire width of the enclosure, to allow standard I/O cables and power cables to pass protected from the CPU enclosure 20 to the flat drive bay 40. Because the cables are fully enclosed inside the hinge, they are protected from stretching, pinching and radiating energy even when the flat drive bay 40 is adjusted. The outer ends of the cable hinge opening 64 are plugged with metal EMC buttons (not shown) when outside drive bays are not assembled, described later.

The flat drive bay 40 preferably accommodates three main device drives, and therefore has three bays, as shown in the embodiment of FIG. 1. The drive bays can be arranged side by side on a bottom cover 44 of frame 38, so as to present a flat top 26 to create a keyboard tray. Each drive bay is preferably of equal width and depth. A mounting bracket as shown at 46 for the left device drive bay, can replace the bottom cover 44 to allow the height of that drive to expand enough to accommodate a five-and-a-quarter inch drive such as the CDROM drive depicted as item 45. With a bottom cover 44 in place, any three-and-a-half inch drive such as a floppy depicted as item 42 can be secured to the flat bay with a front bracket such as 49.

The device drivers are inserted in the bays from the front of the flat drive bay, and the cables a 16, 17, 18 reconnected as seen better in FIGS. 2 and 3a. When drives do not occupy the bays, the front of a bay can be covered with a faceplate 43.

Sturdy metal outside drive bay rails 47 and 48 are present on walls of flat drive bay 40 to allow further expansion of the computer system. An outside drive bay 60 seen in FIG. 2 has a similar size and shape with the drive bays provided in flat drive bay 40. Such a bay has a thicker steel base 61, which is permanently attached to a thinner cover 62, and a cable hinge opening 64. The base is thicker to resist forces exerted on the bay in its cantilever position.

Outside drive bay 60 is attached to bay 40 by sliding it from front to back into the guide rails 47 or 48 until the hollow hinge 31 of the cable hinge assembly 30 is aligned with the cable hinge opening 64 of the outside drive bay. Bays 60 can be outward mounted to either side of the flat drive bay 40, with their bottom surfaces aligned and the top surface raised suitably for a mouse pad. Mounting of the larger five-and-a-quarter inch bays in the outward position has the advantage of keeping the flat drive bay to a minimum height while maximizing the space below the bays for the user's knees.

FIG. 1 also shows a cable clip assembly 70 that allows external computer cables to be dressed at the front of the desk and then slid to the back of the desk to get them out of sight and out of the way, as described later in connection with FIG. 6a.

FIG. 2 is a rear isometric view of the ergonomic pull-out computer housing showing the CPU enclosure cover 25, the flat drive bay cover 26, and the interconnect access cover 63 in an exploded state. The body of the CPU enclosure 20 comprises left and right vertical walls 21 and 22, a base (not visible) for mounting the electrical and electronic components and a cover 25. A front enclosure wall 15 faces the flat drive bay 40 being provided with an opening 14 (also called "the first opening") for enabling the cables to pass between the two enclosures.

A back enclosure wall 19 has expansion slots 29, fan assemblies, and cable connectors, which are also seen in FIG. 6a. The motherboard 11, hard disk 12, power supply 13, etc may be placed inside the CPU enclosure as shown in FIG. 2, where cover 25 has been exploded; nonetheless, other arrangements of these parts into enclosure 20 are equally possible.

The routing of the cables from the CPU enclosure 20 to the cable hinge assembly 30 is depicted in FIGS. 2 and 3a. FIG. 3a is a front isometric view of the pull-out computer housing showing the flat drive bay rotated down, and the interconnect access covers exploded for cable installation and connection. As indicated above, the hinge assembly 30 encloses the cables connecting the electronics in the CPU enclosure to the electronics in the flat drive bay 40. These could be for example large IDE ribbon cables 16, power cables 17, and data cables 18. Signal and power cables 65 to/from the device drivers in the respective outside drive bay 60 pass through the cable hinge into the rear of the bay 60.

The hinge assembly 30 is preferably made of metal to function as a Faraday cage extension of the CPU enclosure while allowing an opening 14' (also called the "second opening") seen at the rear center of the cable hinge assembly.

Cables 16, 17 and 18, shown leaving the mother board 11, the power supply 13, or hard-drives 12 exit through the large rectangular opening 14 in the middle of the CPU enclosure front wall 15, as indicated above. Opening 14 in the enclosure wall 15 of the CPU enclosure covers opening 14' when the flat drive bay is in the working position, so that the cables pass from CPU enclosure 20 to flat drive bay 40 through openings 14 and 14'. Cables exit the cable hinge center to travel either left or right through the large metal tubes 23 of the hollow hinge 31 to the drive bays, which are arranged side by side in flat drive bay 40. A removable interconnect access cover 33 snaps into place to cover the space between the hollow tubes 23.

Flat bay cover 26 has been removed to show openings 37, 37', and 37" (also called "cable access openings") in the flat drive bay frame 38, which allow cables to be inserted into the back end of media drives in the flat drive bay slots. Cover 26 must be removed to expose the cable access openings 37, 37', 37" and allow cable installation. Similarly, removing cable access cover 63 of on outside drive bay 60 allows cable insertion into the back of that device.

Figure 3B:
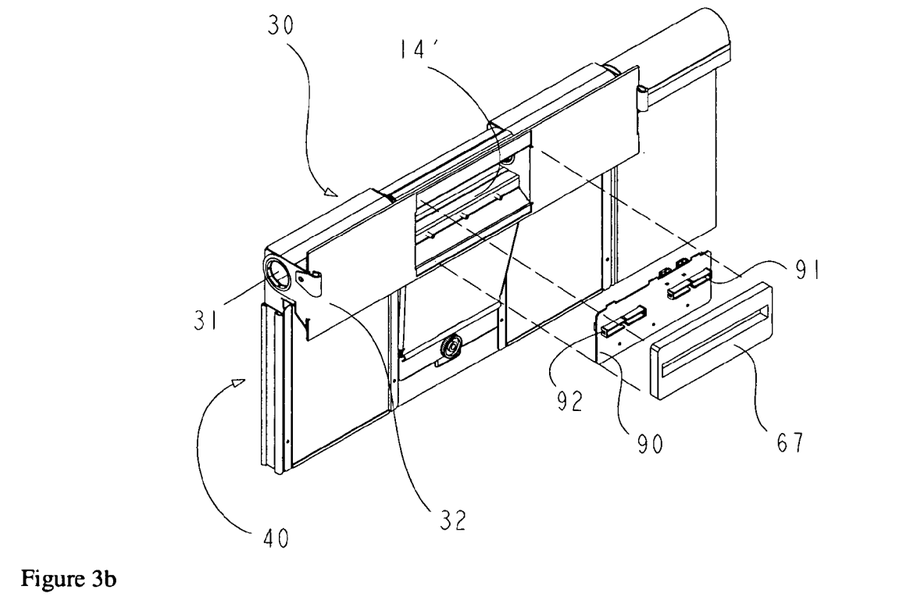
FIG. 3b is a rear isometric view of FIG. 3a, but without the CPU enclosure to show the mounting of the mid board assembly and gasket.

In one embodiment of this invention, a mid-board interconnect assembly 90, with plated edges and solid ground planes prevents noise from leaving the inside of the CPU enclosure 20. Assembly 90, which is shown in opening 14' in FIG. 3a, and is better seen exploded in rear isometric view shown in FIG. 3b, is fixed at the rear of the cable hinge assembly. Cables 16, 17, 18 attach to connectors 91, 92 on the back of assembly 90 (the side that faces enclosure 20). This arrangement allows for the flat drive bay 40 and CPU enclosure 20 to be separated for shipping and re-attached later, without opening the CPU enclosure.

The outer front side of the mid-board interconnect assembly 90 is accessed by removing cable access cover 33, as shown in FIG. 3. In addition to connectors 91, 92, all on/off switches, input and output ports, and removable media drive ports are preferably integrated into the center of the cable hinge assembly. Thus, the on/off switches 34, LEDs 35, and user interface data ports 36 such as USB and Fire-wire are provided on the front side of the mid-board interconnecting assembly (the side that faces the user in the working position). The front side of the mid-board assembly 90 could also hold mouse and keyboard connection ports, which are not shown here. The switches 34, LEDs 35, and data ports 36 are mounted at a right angle to the mid-board and protrude through openings cut in the top flat surface 68 of the hinge assembly base 32.

By lining up the cable connectors 91, 92 into a row in opening 14', the cable hinge assembly 30 can slide up and down without connectors 91 hitting the top or bottom of the opening 14. Also, since the center of the cable hinge assembly 30 is located immediately behind the keyboard, easy access to all controls is enabled. The adjustable positioning of the flat drive bay and hollow hinge assembly put the controls into an ergonomic position for the user.

In an alternate embodiment of the invention the cables 16, 17, 18 pass directly through the opening 14' to the back of the drive bay devices 37 mounted in the flat drive bay. In this case, a smaller circuit board is needed to mount the power switches 34 and access ports 36 at the top front 68 of the cable hinge assembly 30.

An EMC gasket 67, seen in FIG. 3b is preferably sandwiched between the mid-board interconnect assembly copper surface 90 and metal wall 15 of the CPU enclosure. The EMC gasket 67 increases the shielding effectiveness of the CPU enclosure, and prevents noise from entering and leaving between the CPU enclosure and the cable hinge assembly.

As seen in FIG. 1, the guide rail system 50 includes two u-shaped guide rails 51 and 52 installed parallel to each other under the desk top, as discussed in further detail in connection with FIG. 6a. CPU enclosure 20 is the only part of the ergonomic pull-out computer housing that slides in a guide rail system 50, with a tongue-in-groove design depicted in a detail view in FIG. 4. The ergonomic pull out computer housing can be inserted into the rails 51 of the guide rail system 50 without tools. The guide rail system 50 is separate from the ergonomic pull out computer housing, and has been designed to be either quickly and temporarily adjoined to the underside of a desk for very quick setup, or to be permanently attached for maximum security and safety.

Figure 4:
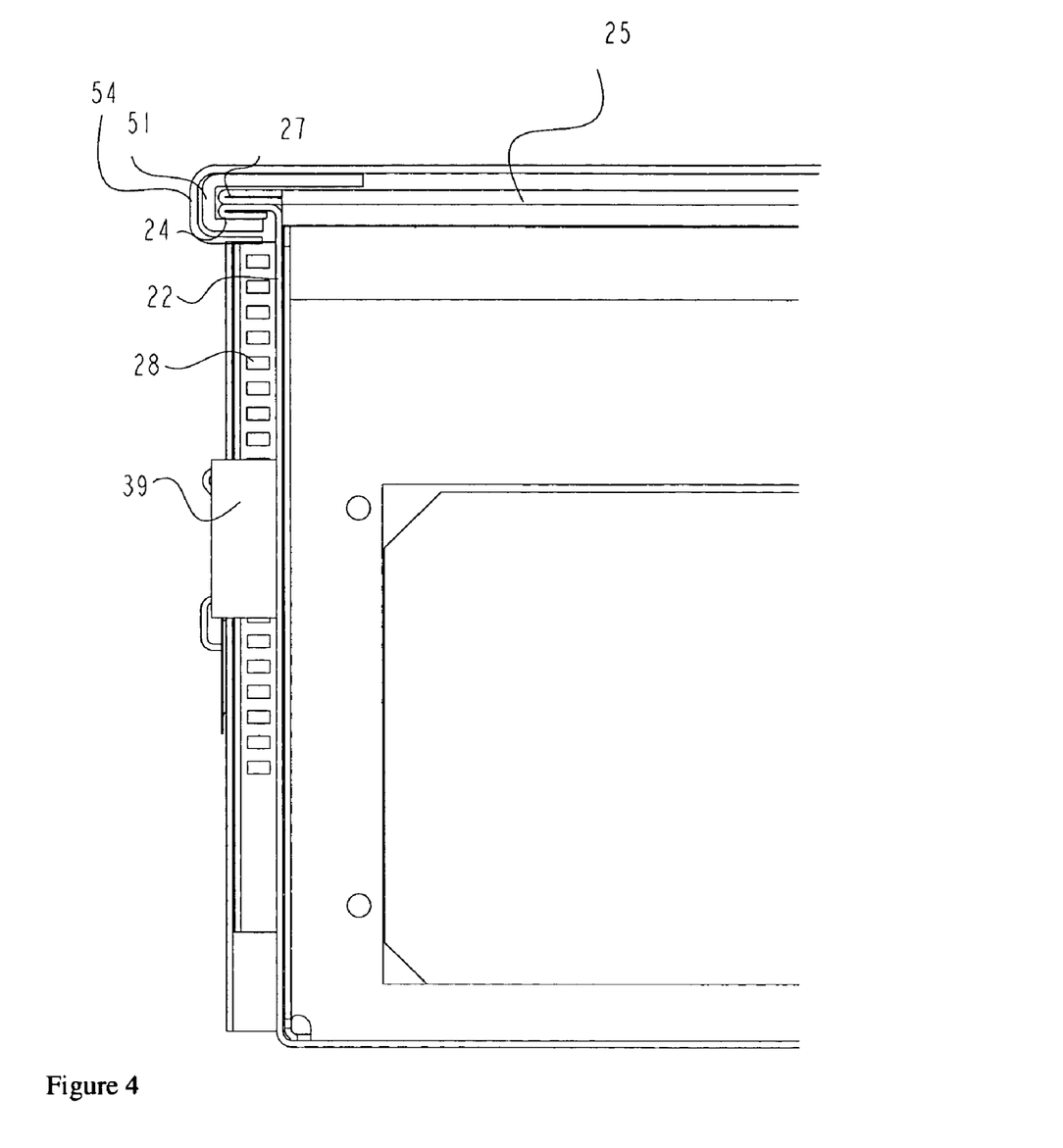
FIG. 4 is a detailed view of the guide rail system and elevation mechanism as viewed from the rear.

FIG. 4 is a close-up of the guide rail system as viewed from rear left of the desk. This view illustrates how the CPU enclosure cover 25 is hemmed on its left edge to form a first top hemmed ledge 27; the same bending is performed on the right edge to form a second top hemmed ledge, not shown. The left vertical wall 21 (and the right vertical wall 22) of the CPU enclosure 20 is also bent outward 90° at the top, along its full length from front to back, to form a left hemmed ledge 24 (and a right hemmed ledge respectively, not shown). The hemmed ledge 27 is flush with the hemmed ledge 24; features 24 and 27 together, form a tongue adapted to slide in the u-shaped grooves of the guide rails 51 and 52. The guide rail 51 is wide enough to allow the thickness created by parts 24 and 27 to slide freely. At the same time, second top ledge and the right ledge slide freely in the u-shaped guide rail 52.

Figure 5:
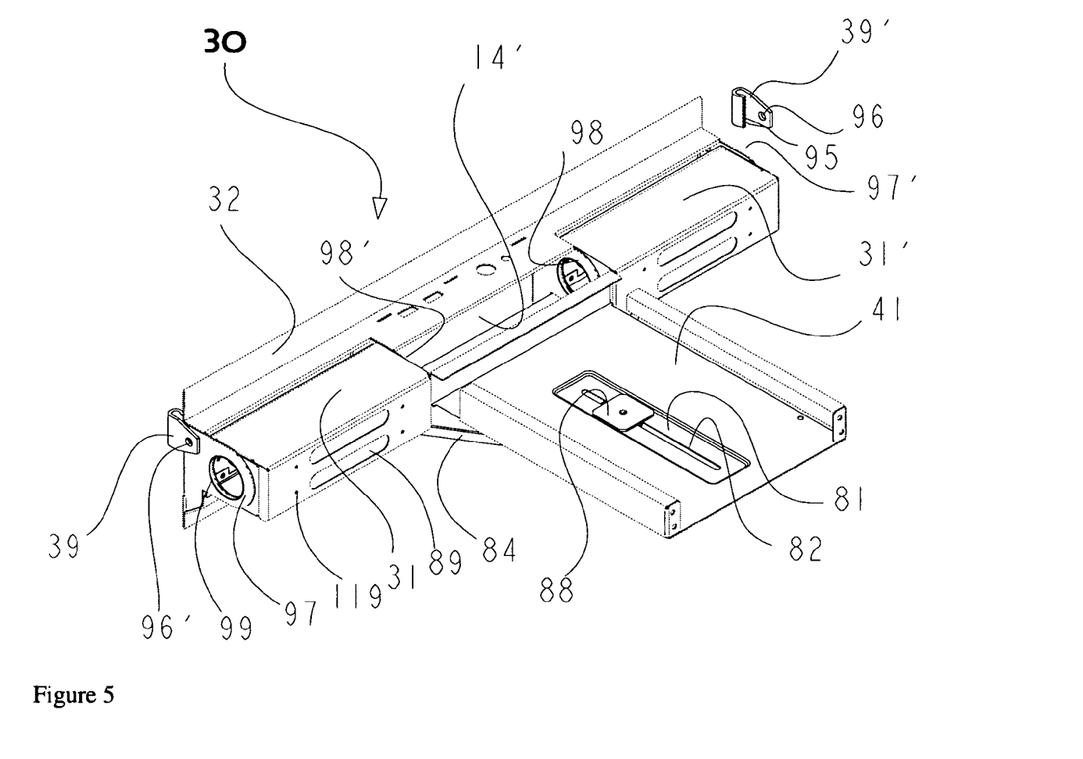
FIG. 5 is an isometric view of the cable hinge assembly, with the interconnect access cover removed and the flat drive bay frame removed.

FIGS. 4 and 5 also show in detail how the gravitational elevation means operates. The elevation mechanism is formed by height adjustment hook 39 and identical and opposing hook (not shown). As seen in FIG. 5 for hook 39', the hooks are provided with teeth 95, which mesh with the patterned cutouts 28 bent out of the side wall 22 of the CPU enclosure. The hooks are pivotally attached to the lateral sides of base 32 of the hinge assembly 30. When the rear of the flat drive bay 40 is lifted, the hook will rotate about holes 96 and hinges 96' to allow the teeth to un-mesh and the height of the flat drive bay to be altered.

FIG. 5 is an isometric view of the cable hinge assembly by itself, with the interconnect access cover 33 removed and the flat drive bay frame 38 removed.

The cable hinge assembly is comprised of a fixed base plate 32 which can slide up and down relative to the CPU enclosure 20, and rotating metal tubes 31, 31' hingedly attached to the base plate 32 by lateral supports 97, 97' and by medial supports 98, 98'. The hinge assembly has a base 32 that presents a top flat surface 68. Each hollow tube has 90 degree rimmed holes 99 that protrude into slightly larger holes in corresponding supports. The rimmed holes allow the metal tubes to stay captive and rotate around the holes in the supports, which share the same axis of rotation. The holes are large enough to allow the passage of cables to the hollow tubes 31, from where they can exit at openings 89 into the flat drive bay 40, or through the holes in the lateral supports 97, 97' into an outside drive bay 60.

As seen in FIGS. 1 and 5, the center bay also acts as a pivot assembly 80, to enable adjusting the relative position (angle) of the flat drive bay 40 with respect to the computer enclosure 20. The top of the flat drive bay frame has been removed for clarity, but is not usually removable from the middle drive bay base 41. As indicated above, the center bay preferably holds either a floppy drive or a slim-line CDROM on base 41. For example, a CDROM, which can fit in a 1" high bay may be placed in the center drive bay. The center drive bay base 41 has an embossed channel 81 with a long slot 82. The slot 82 allows the translation of internal sliding plate 88 while a threaded stud (not shown) attached to plate 88 protrudes through the slot 82 and through an external sliding plate 86, to fasten to an internally threaded knob 83. The translation of plates 86 and 88 and knob 83 from front to back allows the pivot assembly 80 to be clamped into different positions by hand tightening knob 83 (see FIG. 1).

A pivoting arm 84 is attached hingedly at one end to the base 32 of the hinge assembly 30. The other end is always pulled upward toward the center drive bay base 41 with an internal spring (not shown) to keep it flush against the bottom of the drive bay base 41. This second end of arm 84 is held in position by gravity pulling the flat drive bay down and into an overhanging lip 85 of sliding plate 86. Clamping the external sliding plate 86 into place prevents pivot arm 84 from moving and secures the entire flat drive bay 40 to the desired angle.

FIG. 6a shows the ergonomic computer housing 10 in the hanging condition, computer setup position, with the desk top removed for clarity. On the rear of the CPU enclosure 20 are pivoting hangers 55 and 55', which are used to hang the computer upside down from the guide rail system 50 during stow-away and setup positions. The hangers 55 and 55' are hingedly attached to the CPU enclosure 20 at a hinge point 56 that allows the entire computer assembly to be rotated up into the slots of the guide rails 51 and 52 once the rear cabling is complete. Pivoting hangers 55 and 55' may be joined with a bar 74 from the left side to the right which can also act as a carrying handle.

FIG. 6a also illustrates how cable installation is simplified by having the I/O ports, power supply 13 and expansion slots 29 facing upwards. This aspect of the invention allows easy cable installation to the rear of the computer compared to reaching or crawling behind the case, as with conventional computer cases. Once cables are installed into the rear of the enclosure the cables are dressed in the cable clip assembly 71 and 72, the computer is in the operational state, and the CPU enclosure 20 is rotated up and pushed back to engage hemmed edges 24, 27 into rails 51, 52.

Preferably rails 51 and 52 can be directly mounted on the back of the desktop (table). Front and rear guide support brackets can be used to adjust sliding depth in the event that the depth of the desk is unknown and adjustment is required in front to rear depth. FIG. 6a further shows this mounting solution, where the guide rail system 50 includes a front guide support 53 and a rear guide support 54, which are fixed to the back of the desktop using fastening screws through mounting holes 77 provided on the front and rear guide supports. The u-shaped guide rails 51 and 52 nest inside bigger U-shaped channels formed out of the sides of the front and rear guide supports 53 and 54. Supports 53 and 54 have the same profile and can be seen from the rear left in FIG. 4.

The rail guide system may also be quickly installed by optionally inserting separate legs 57, 57' into circular channels 121, 121' which are formed out laterally from the 90 degree bent down walls of the rear guide support bracket 54. The leg height can be grossly adjusted with spring tabs that spring out of the top of legs 57 into holes 58. Fine adjustments can be made by rotating the screw-on feet 76 at the bottom of legs 57 and 57'. Small C-clamps (not shown) can also optionally be used to attach a front guide support bracket 53 to the desk at locations 59 and 59'.

The depth of the assembly can be adjusted for different size desks by sliding the rear guide support 54 to the front or back with respect to guide rails 51 and 52.

Figure 6B:
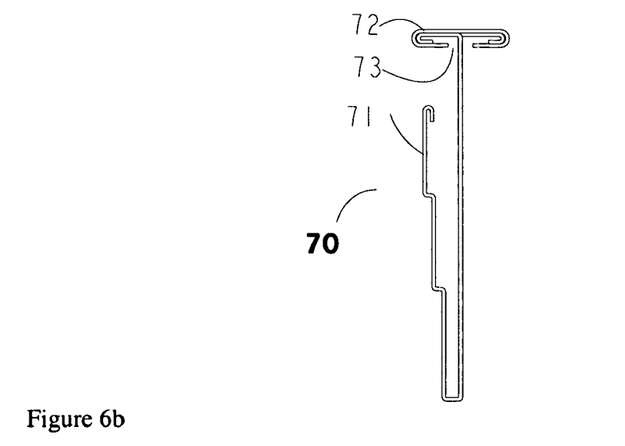
FIG. 6b is a side view detail of the cable clip assembly.

FIGS. 6*a* and 6*b* also show the cable clip assembly 70 comprised of two parts, a cable clip beam 72 and a cable clip 71. The cable clip beam 72 is preferably the same width as the top of the CPU enclosure 20 so that it can slide in the same guide rail system 50 as used by the CPU enclosure. Although the cable beam 72 is formed from one piece of sheet metal, its longitudinal sides are bent in a u-shape on both sides to meet almost in the middle to form a channel 73 as seen in FIG. 6*b*. Channel 73 is sized to engage the head 74 of the cable clip 71 to slide in the channel 73. The cable clip 71 is then free to slide all the way from left to right in the channel 73 of cable clip beam 72.

The cable clip 71 allows the installer to dress the cables (power, LAN, modem, monitor, speakers etc.) when the housing is in computer setup position, as discussed earlier. This cable management system also keeps cables out of sight and off the floor where they can tangle in the user's feet.

Figure 7:
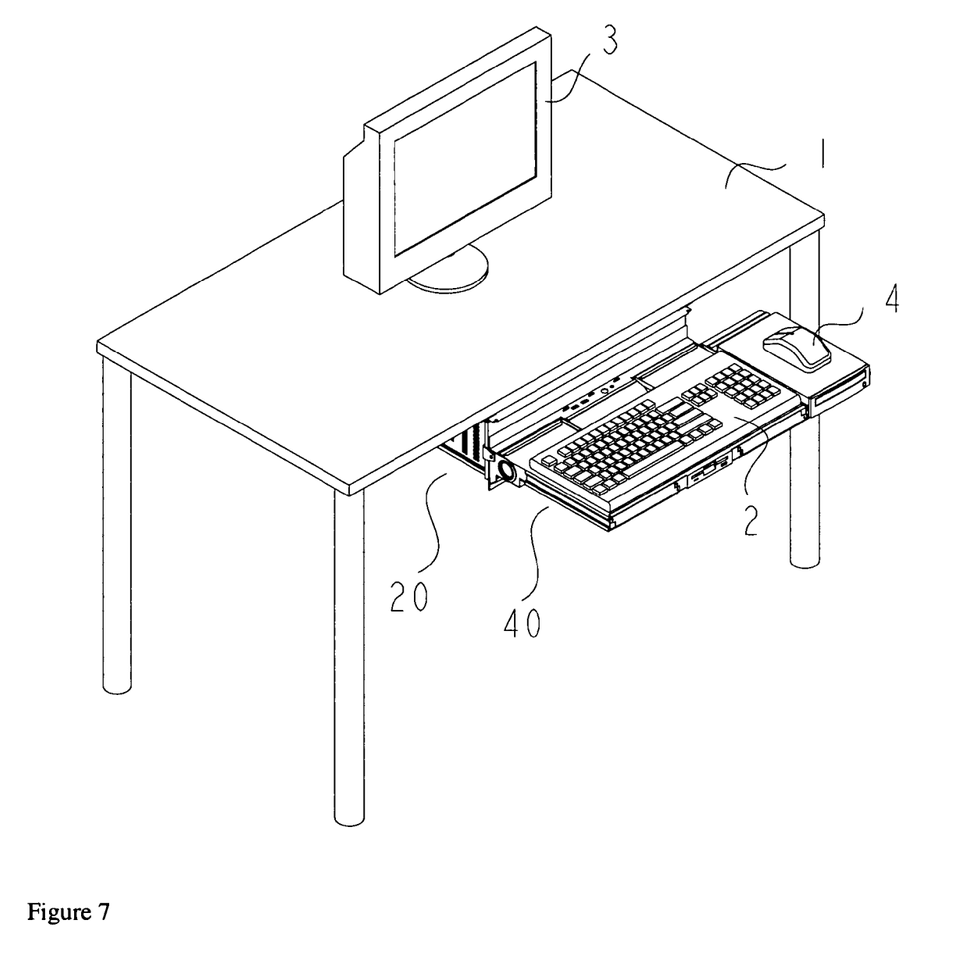
FIG. 7 is an isometric view of the ergonomic pull-out computer housing in an operational condition, working position, where the flat drive bay is pulled out from underneath a desk.

FIG. 7 illustrates the intended office application of the ergonomic pull-out computer housing. The housing 10 is in the working position, being pulled out from under the desk such that the CPU enclosure 20 is beneath the desk 1, while the flat drive bay 40 extends beyond the front of the desk to provide trays for a keyboard 2 and a mouse 4.

Another embodiment of this invention combines the keyboard 2 and the flat drive bay 40 into a single enclosure such that the keyboard is integrated into the drive bay.

Figure 8A:
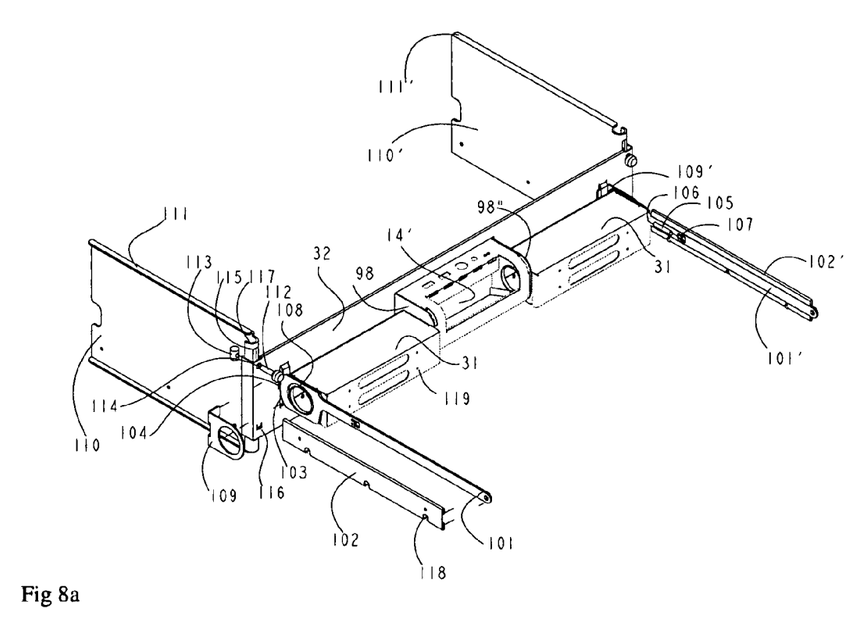
FIG. 8a is another embodiment of the computer rails, elevation device, and ratcheting pivot mechanism.
Figure 8B:
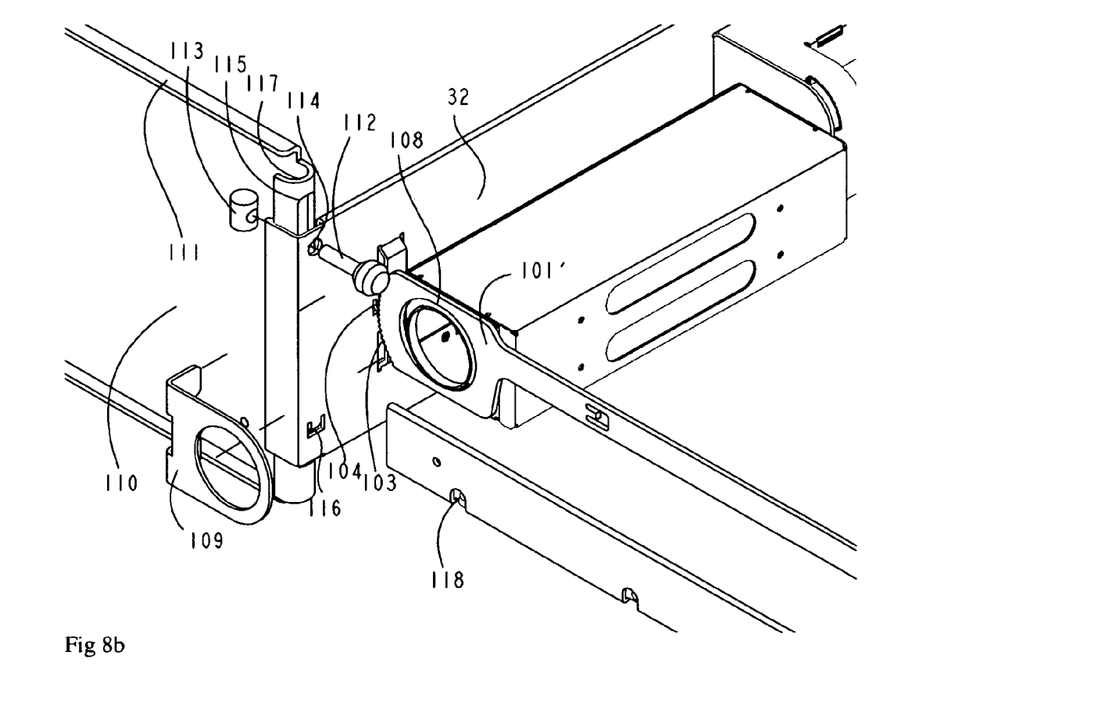

FIG. 8*a* is another embodiment of the computer rails, elevation device, and ratcheting pivot mechanism. FIG. 8*b* is a detail view of FIG. 8*a*. These figures show another embodiment of the guide rail system 50. In this embodiment separate thicker side walls 110, 110' are fastened to either vertical side of CPU enclosure 20. Ledges 111, 111' are formed from 90 degree bends of the top edge of the separate side walls 110, 110' rather from the CPU enclosure walls and cover of the case.

FIG. 8*a* and 8*b* also illustrate another embodiment of the elevation mechanism in which a common thumb screw 112 inserts through a hole in the hinge assembly base wall 32, and then through a vertical obround slot 115 in rolled wall 117 which is bent out of the front vertical edge of side wall 110 or 110'. The threads of thumbscrew 112 then fasten into a common threaded cross-dowel 113. Tightening thumbscrew 112 applies a clamping load between front wall 32 and the rolled wall 117 to fix the vertical position of the entire hinge assembly 30. The arrangement is repeated on the right side of the hinge assembly. When thumbscrews 112 are not fully fastened the hinge assembly is prevented from falling by a vertical pattern of small slots in rolled wall 117 which are immediately behind the far edges of wall 32, identical to slots 28 if FIG. 4. The weight of the flat drive bay creates a torque about the cable hinge resulting in a force of the lower edge of wall 32 against rolled wall 117. Since tabs 116 protrude backward from wall 32 to line up with slots 28, the assembly is prevented from sliding downwards.

FIG. 8*a* and detail FIG. 8*b* illustrate another embodiment of the pivot assembly. In this embodiment of the invention the flat drive bay is prevented from falling by gravitational forces by teeth 104 at the rear of ratchet arm 101 engaging with ratchet stop 104. Identical left and right ratchet arms 101, 101' are freely enclosed in a channel created by fastening the inwardly hemmed ratchet guides 102, 102' to side vertical walls of flat drive bay 40, not shown, using fastening points 118. A flat drive bay 40 can be fastened to this pivot assembly with fasteners for its rear through holes 119, and fasteners through its side at holes 118. The flat drive bay has been removed to show how tension spring 105 attached from the hollow tubes 31 at point 106 pulling the ratchet arms 101, 101' toward the hinge. A separate identical spring 105 is used on either side of the hinge assembly to force ratchet teeth 103 into ratchet stop 104. The user just needs to pull the front of ratchet arms 101 and 101' to disengage the teeth and adjust the angle of the flat bay assembly. The large hole 108 around the hinge is an obround shape to allow the ratchet arm to slide forward when pulled from the front. Side supports 109 are separate items to allow the assembly of ratchet arms 101 and 101' to the cable hinge assembly.

Although the present invention has been described in considerable detail with reference to certain preferred embodiments thereof, other versions are possible. Therefore, the spirit and scope of the appended claims should not be limited to the description of the preferred embodiments contained herein.

I claim:

1. A pull-out computer housing for enabling easy installation and ergonomic positioning of a computer system units and controls, comprising:
   a central processing unit (CPU) enclosure for housing all standard units of the computer system;
   a flat drive bay with a flat top for housing all accessible units of said computer system and for supporting a computer keyboard; and
   a hinge assembly provided between said CPU enclosure and said flat drive bay for enabling adjustment of the flat top to a preferred angle and a preferred elevation.

2. The computer housing of claim 1, wherein said CPU enclosure comprises:
   a CPU body formed of a left and a right wall, a back and a front enclosure wall, an enclosure base and an enclosure cover;
   a first opening in said front wall for providing a passage for the cables connecting said standard units with said accessible units;
   a right and a left hemmed ledge formed on a respectively top side of said left and right walls; and
   a first and a second top hemmed ledge formed on a respective right and left side of said enclosure cover, wherein said right hemmed ledge and said first hemmed ledge form a right tongue and said left hemmed ledge and said second hemmed ledge form a left tongue, for enabling displacement of said CPU enclosure on a guide rail system.

3. The computer housing of claim 2, wherein said CPU body further comprises a plurality of cutouts on each of said left and right walls, a pair of cutouts for engaging a pair of hooks provided on said hinge assembly, for adjusting the elevation of said flat drive bay for ergonomic positioning of said keyboard.

4. The computer housing of claim 1, wherein said CPU enclosure comprises a CPU body and a pair of hangers pivotally attached to said CPU body for enabling translation of said housing between a hanging condition and an operating condition.

5. The computer housing of claim 1, wherein said flat drive bay comprises:
a bay frame for forming a central bay and two side bays, each bay for holding one of said accessible units;
a bottom support mounted on said frame for holding said accessible units; and
a top cover for mounting on said frame to provide said flat top.

6. The computer housing of claim 5, wherein said bottom support is a mounting bracket for each said bays provided on said bay frame and wherein said mounting brackets are provided at a distance from said top cover selected to accommodate accessible units of various heights.

7. The computer housing of claim 5, wherein said bay frame also comprises a cable access opening at each bay for enabling connection of a cable to a respective one of said accessible units.

8. The computer housing of claim 5, wherein said flat drive bay further comprises an outside drive bay rail provided on one side of said frame for enabling addition of an outside drive bay for expanding said computer system.

9. The computer housing of claim 8, wherein said outside drive bay comprises:
an outside bay base for holding a respective accessible unit and accommodating a cable for connecting said accessible unit to said standard units;
an outside drive bay cover for mounting on said outside base to provide a flat surface for accommodating a computer mouse; and
and access cover for enabling access to said cable.

10. The computer housing of claim 5, wherein said hinge assembly comprises:
a base for mounting on a front enclosure wall of said CPU enclosure, said base having a second opening; and
a hollow hinge fixed on said base for rotatably attaching said base to said bay frame,
wherein said first opening covers said second opening for enabling routing of said cables from said standard units to said respective accessible units through said first and second opening and through said hollow hinge.

11. The computer housing of claim 10, wherein said hinge assembly further comprises an elevation mechanism for enabling setting said preferred elevation of said flat bay drive with respect to said CPU enclosure.

12. The computer housing of claim 1, wherein said elevation mechanism comprises a pair of hooks fixed to the left and right sides of said base, each said hook having a plurality of teeth for engaging a corresponding pair of cutouts provided in a respective right and left wall of said CPU enclosure.

13. The computer housing of claim 1, wherein said hinge assembly comprises:
a hollow hinge mounted on a front enclosure wall of said CPU enclosure and on the frame of said flat drive bay for enabling rotation of said flat drive bay between a pull-up position and a maintenance position; and
a pivot assembly for securing said flat drive bay to assume said preferred angle.

14. The computer housing of claim 1, wherein said hinge assembly comprises a mid-board interconnecting assembly for accommodating one or more switches, input and output ports, and removable media drive ports.

15. The computer housing of claim 14, further comprising an EMC gasket sandwiched between said mid-board interconnect assembly and said front wall of the CPU enclosure.

16. The computer housing of claim 14, wherein said mid-board interconnecting assembly is manufactured with plated edges and solid ground planes for preventing noise from leaving the inside of said CPU enclosure.

17. The computer housing of claim 14, wherein said mid-board interconnecting assembly further accommodates connectors for one or more cables routed between said CPU enclosure and said flat drive bay, for enabling separation and re-attachment of said CPU enclosure and said flat drive bay without opening said CPU enclosure.

18. The computer housing of claim 1, wherein said standard units comprises a motherboard, a power supply and one or more hard drives.

19. The computer housing of claim 1, wherein said accessible units comprises a plurality of device drivers such as a floppy drive, a slim-line CDROM, a Zip drive.

* * * * *